United States Patent
Sedouram et al.

(10) Patent No.: US 12,267,329 B2
(45) Date of Patent: Apr. 1, 2025

(54) PROACTIVE RENDERING OF CREDENTIALS ACCORDING TO DETERMINED LOCATION CHARACTERISTICS

(71) Applicant: GOOGLE LLC, Mountain View, CA (US)

(72) Inventors: Ramprasad Sedouram, Bangalore (IN); Daniel V. Klein, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 206 days.

(21) Appl. No.: 17/962,804

(22) Filed: Oct. 10, 2022

(65) Prior Publication Data
US 2024/0121245 A1   Apr. 11, 2024

(51) Int. Cl.
*H04L 67/52* (2022.01)
*H04L 9/40* (2022.01)
*H04L 67/306* (2022.01)
*G06F 3/16* (2006.01)

(52) U.S. Cl.
CPC .......... *H04L 63/107* (2013.01); *H04L 63/102* (2013.01); *H04L 67/306* (2013.01); *H04L 67/52* (2022.05); *G06F 3/165* (2013.01)

(58) Field of Classification Search
CPC ..... H04L 63/107; H04L 67/52; H04L 63/102; H04L 67/306; G06F 3/165
See application file for complete search history.

(56) References Cited

U.S. PATENT DOCUMENTS

| 11,605,380 | B1* | 3/2023 | Houston | G06V 20/00 |
| 2011/0085211 | A1 | 4/2011 | King et al. | |
| 2016/0170975 | A1 | 6/2016 | Jephcott | |
| 2016/0205305 | A1 | 7/2016 | McCarthey et al. | |
| 2018/0300324 | A1 | 10/2018 | Ziraknejad et al. | |

(Continued)

OTHER PUBLICATIONS

Anonymous: "Wallet Developer Guide—Pass Design and Creation", Oct. 4, 2022 (Oct. 4, 2022), XP093088076, Retrieved from the Internet: URL:http://web.archive.org/web/20221004034546/ https:// developer.apple.com/library/archive/documentation/ UserExperience/ Conceptual/Passkit_PG/Creating.html.*

(Continued)

*Primary Examiner* — Frantz B Jean
(74) *Attorney, Agent, or Firm* — Gray Ice Higdon (57) ABSTRACT

Implementations relate to an automated assistant that can proactively detect and respond to a request for credentials. Characteristics of an entity requesting the credentials can be preemptively determined by the automated assistant using data that may be provided by the user or other previous visitors to a location. For example, the automated assistant can determine that the entity may expressly request certain information from a user when the user arrives at the location. Based on this determination, the automated assistant can operate to initialize an interface of a computing device of the user, when the user is determined to be at or near the location. For example, an audio interface of the computing device can be initialized to capture an audible request from a person who views credentials before granting access to a feature of the location.

20 Claims, 6 Drawing Sheets

(56) References Cited

U.S. PATENT DOCUMENTS

2020/0233389 A1 7/2020 Ma et al.
2020/0302510 A1 9/2020 Chachek et al.

OTHER PUBLICATIONS

Anonymous; Wallet Developer Guide "Pass Design and Creation"; retrieved from the internet: http://web.archive.org/web/20221004034546/https://developer.apple.com/library/archive/documentation/UserExperience/Conceptual/PassKit_PG/Creating.html; 15 pages; dated Oct. 4, 2022.
European Patent Office; International Search Report and Written Opinion issued in Application No. PCT/US2023/028714; 12 pages; dated Oct. 11, 2023.

* cited by examiner

PROACTIVE RENDERING OF CREDENTIALS ACCORDING TO DETERMINED LOCATION CHARACTERISTICS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, an automated assistant can respond to requests to retrieve certain documents that a user may have stored in their computing device, such as recipes, invitations, messages, etc. When a particular document serves as a credential for being permitted to access a building or other location, certain circumstances can inhibit the ability of the user to audibly solicit their automated assistant to find the particular document. For example, significant background noise can be present (e.g., the user may be in a car and a radio is playing; or the location is a noisy location), which can inhibit the accuracy of speech recognition performed based on processing audio data that captures the user's audible solicitation (and that also captures background noise). Further, the user can be unsure of what particular document is needed and/or how to audibly solicit the automated assistant. This can result in latency in retrieving the particular document and/or can result in multiple spoken utterances being provided by a user (and each processed by the automated assistant) in attempting to retrieve the particular document.

As one particular example, certain industrial facilities can require a particular form of identification to be presented to a security guard before entering, and that particular form can be available in an electronic format and/or in a tangible medium such as a physical card and/or badge. However, a user that is attempting to access the industrial facility may not be aware of this requirement before arriving at the industrial facility. Moreover, circumstance(s) that exist when the security guard audibly requests the user to present a particular credential can present difficulties for retrieving the particular credential through audible interaction with an automated assistant and/or through other interaction(s) with a client device. For example, background noise(s) can inhibit audible interaction and/or the user may be driving a car and have limited dexterity for providing multiple touch inputs in interacting with a client device to retrieve the particular credential Even when the user is aware that a particular credential should be presented at a particular location, resources of a personal computing device can be wasted as the user preemptively navigates their device for a particular document and/or causes the document to be rendered for an unnecessary period of time while waiting for the security guard. For example, a user that is waiting in a long line may leave an interface of their personal computing device active, with a rendering of the particular credential, well before interacting with the security guard thereby wasting significant resources of the personal computing device. Additionally, an application can time-out and require re-authentication if the user waits too long to present the credential.

SUMMARY

Implementations set forth herein relate to an automated assistant that can preemptively activate certain input processing features of a client computing device when a user is estimated to be at, or subsequently arriving at, a location that may require certain credentials be presented for granting access to the location. When an input processing feature (e.g., automatic speech recognition (ASR), warm word detection, etc.) is activated, the automated assistant can utilize one or more of the activated input processing feature(s) to determine whether an entity at the location is requesting that the certain credentials be presented. In response to determining that the entity is requesting that the certain credentials be presented, the automated assistant can cause content to be rendered at a device interface of the client computing device to satisfy the requirement for the certain credentials and/or other information. Alternatively, or additionally, in response to determining that the entity is requesting the certain credentials be presented, the automated assistant can render an indication of the credentials to be presented to the entity (e.g, a reminder that the entity will request a passport and another signed document).

As an example, a user may have a calendar entry in their phone that indicates they will be traveling to a sports event at a particular location in the next few hours. The automated assistant can process data corresponding to the calendar entry and determine whether the particular location is associated with any conditions for gaining access to a feature of the particular location. For example, data stored in association with an account of the user can indicate that the user had previously visited the location and accessed certain credentials via their computing device to show to an entity at an entrance of the location for gaining further access to the location. Alternatively, or additionally, data that is accessible via the computing device can be based on data from one or more other users that have previously visited the particular location, where the data that indicates type(s) of credential(s) accessed by the other user(s) for gaining further access to the location. For example, the data can be based on type(s) of credential(s) accessed by other client devices at the location and, optionally, within a certain time threshold of arriving at the location. As another example, the data can include feedback such as natural language content characterizing experiences of the one or more users interacting with an entity at the particular location in furtherance of receiving access to a feature of the location. For instance, an author of an instance of feedback can include website comments such as, "Be ready to show your State Identification (ID), and any medical credentials if you're there as a medical assistant." Based on processing such data, the automated assistant can determine certain information (e.g., a State ID and medical credentials) that may need to be presented to an entity at the particular location to receive access to a feature (e.g., a medical station) at the particular location. Alternatively, or additionally, other adjustments to characteristics of the content, such as contrast and/or text size, can be adjusted based on the feedback (e.g., "The security guard may have issues seeing things at a distance.").

In some implementations, data that is used to identify a particular location that the user is visiting, or will be visiting, can be utilized to determine environmental features of the particular location and/or other information that can be useful for determining a context of the location. This information can then be utilized to customize a presentation of certain content for an entity that limits access to the location. For example, an amount of light at the location can limit an ability of the entity (e.g., one or more persons, scanners, and/or other devices) to detect the content rendered by a computing device of a user. The amount of light can be described by feedback from persons that have visited the location and submitted feedback to a website or other application, or by the intensity of ambient light impinging on and/or detected by the user's device. The automated assistant can identify and process this feedback to cause the rendering of content to be compensated for the amount of light at the location. For example, when the automated assistant determines that the entity has expressly requested certain information (e.g., "Please show me your State ID and medical credentials."), the automated assistant can at least temporarily cause an increase in brightness to a display of the computing device to compensate for a detected amount of illumination.

In some implementations, the automated assistant can generate instructions for initializing ASR, warm word detection, and/or any other speech processing technique when the user is at or near a location of the entity. For example, based on data available to the automated assistant, the automated assistant can initialize a certain speech processing technique to detect a particular word or phrase from the entity. In some implementations, the automated assistant can employ a warm word detection technique for detecting an entity-related word, such as "documents," "credentials," etc., that the entity may use when requesting certain information from the user. Processing speech from the entity can be performed using a low power digital signal processor (DSP) that can execute one or more models (e.g., a model for detecting "document," a model for detecting "credentials," etc.) and limit power consumption of a computing device. In various implementations, warm word detection, for word(s) and/or phrase(s) relevant to the entity, can be activated at a client device responsive to detecting the client device has arrived at or near a location corresponding to the entity, and can continue until word(s) and/or phrase(s) are detected or after the user has departed the location (with prior permission from the user). Put another way, warm word detection for word(s) and/or phrase(s) relevant to the entity can be dormant until it is detected the client device has arrived at a location corresponding to the entity, and can again be dormant after word(s) and/or phrase(s) are detected, or alternatively, after the client device has departed the location corresponding to the entity.

Alternatively, or additionally, ASR can be performed such that detected word(s) and/or phrase(s) related to requests for information can be responded to (e.g., by causing rendering of corresponding credential(s), while other detected word(s) and/or phrase(s) can be ignored, at least when the user is at or near the location of the entity. For example, ASR can be performed at a client device, responsive to the client device arriving at the location of the entity, and can continue until word(s) and/or phrase(s) related to a request for information are detected. For instance, ASR can be performed to cause rendering of credential(s) responsive to ASR text indicating the occurrence of the word(s) and/or phrase(s) related to requests for information, while all other ASR text is ignored. As a particular instance, assume ASR is performed upon arriving at a location and produces ASR text of "what's the weather look like today" before producing ASR text of "can I see your credentials". The ASR text "what's the weather look like today" can be ignored, despite it being a request that can be responded to by the automated assistant, due to ASR being performed solely for detecting occurrence of the word(s) and/or phrase(s) related to requests for information. However, detecting the ASR text "credentials" can cause corresponding credential(s) to be rendered. Accordingly, when ASR and/or warm word detection are active and detect word(s) and/or phrase(s) related to an information request, the automated assistant can cause certain information to be rendered at an interface of the computing device. In these and other manners, ASR, warm word detection, and/or other input processing technique(s) can be utilized to enable credential(s) to be rendered at a client device when they are needed, without wasting computational resources (e.g., battery life of the client device) by rendering the credential(s) too early. Further, ASR, warm word detection, and/or other input processing technique(s) can be activated only when the client device is detected at or near the location and only for a certain duration (e.g., until corresponding input is detected), thereby enabling credentials to be rendered when needed, while balancing client device resource requirements needed for the input processing.

In some implementations, the entity can provide entity data to a client computing device of a user by providing an output that can be captured by the client computing device, but may not be detectable by an unassisted human. Put another way, the output can be output that is not detectable by a human naturally (e.g., without use of assistive electronic device(s)). For example, the entity can be an entity computing device that emits one or more frequencies that are above a frequency threshold, such as a frequency that is above 20,000 Hertz and/or any other frequency value above or below 20,000 Hertz (e.g., 80% of the frequencies of the output of the entity computing device can be above an audible threshold for unassisted human hearing), or by output from a particular WiFi Access Point, or other signaling. The output from the entity can embody data that characterizes a request for the user and/or the computing device of the user to present certain information to the entity. In response, the computing device of the user can identify the certain information in preparation for presenting to the entity, and/or make any operational adjustments to prepare for presenting the certain information to the entity.

For example, the entity can indicate certain features of an ID that should be presented to the entity and, in response, the automated assistant can extract and isolate those features from the ID (e.g., a face image from the ID), and/or blur out unneeded features of the ID, before rendering the information for the entity. Alternatively, or additionally, the automated assistant can determine a preferred language of the entity and cause content to be translated into the preferred language of the entity. For example, the automated assistant can determine that the user has medical credentials stored in their device in Spanish, and that the entity may prefer to see the medical credentials in German. Based on this determination, the automated assistant can translate portions of the medical credentials, and render the translation, with other portions of the medical credentials (e.g., a snippet of a portion of a medical ID badge), for the entity when the user arrives within a certain threshold distance of the location.

In some implementations, the automated assistant can process data in furtherance of determining whether the entity prefers to see certain information in a particular order (e.g., State ID first, and then medical credentials). This determination can be based on data stored in association with the entity and/or the location (e.g., comments on a website related to the location and/or the aggregated experiences of prior users, with prior permission from those users), and/or data that is provided directly by the entity when the user arrives at the location (e.g., spoken natural language from an employee working at the location). Based on this determination, the automated assistant can render a swipe-able stack of images, a scrollable stack of images, and/or any other prioritized arrangement of different types of information for the entity and/or the user to interact with for verifying that the user should have permission to access one or more features of the location (e.g., a medical tent). In some implementations, the automated assistant can lock or otherwise restrict access to other applications of the computing device when content is being rendered for the entity. For example, in response to determining that the user is within a threshold distance of arriving at the location, the automated assistant can cause the computing device to temporarily enter an at least partially locked state, while simultaneously rendering content corresponding to the certain information that the entity is expected to request, or is already requesting without enabling other device interaction without an unlock code.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
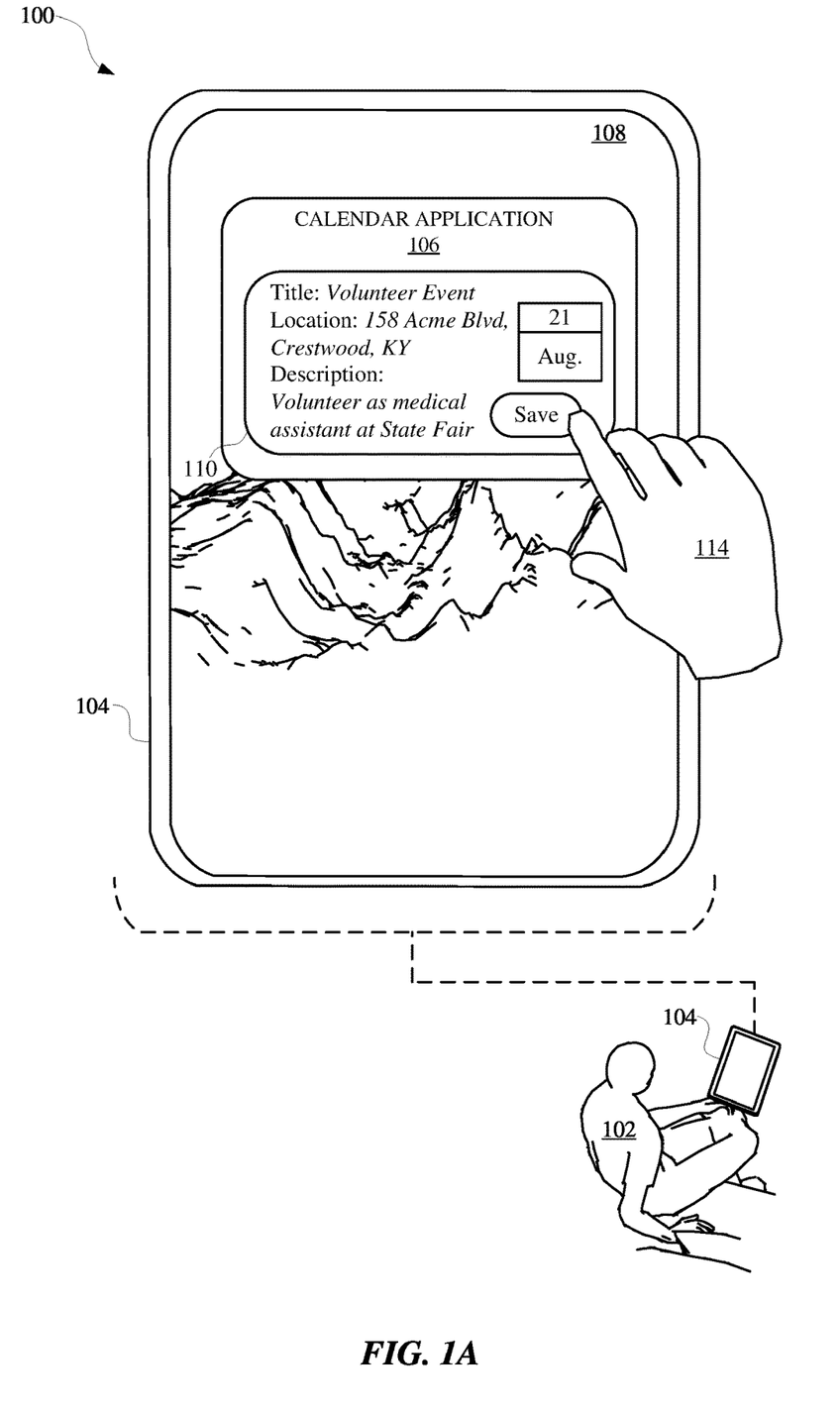
FIG. 1A, FIG. 1B, and FIG. 1C illustrate views of an automated assistant that controls rendering of certain information to an entity that may limit access to a feature of a location according to whether the certain information is presented by a user.
Figure 1B:
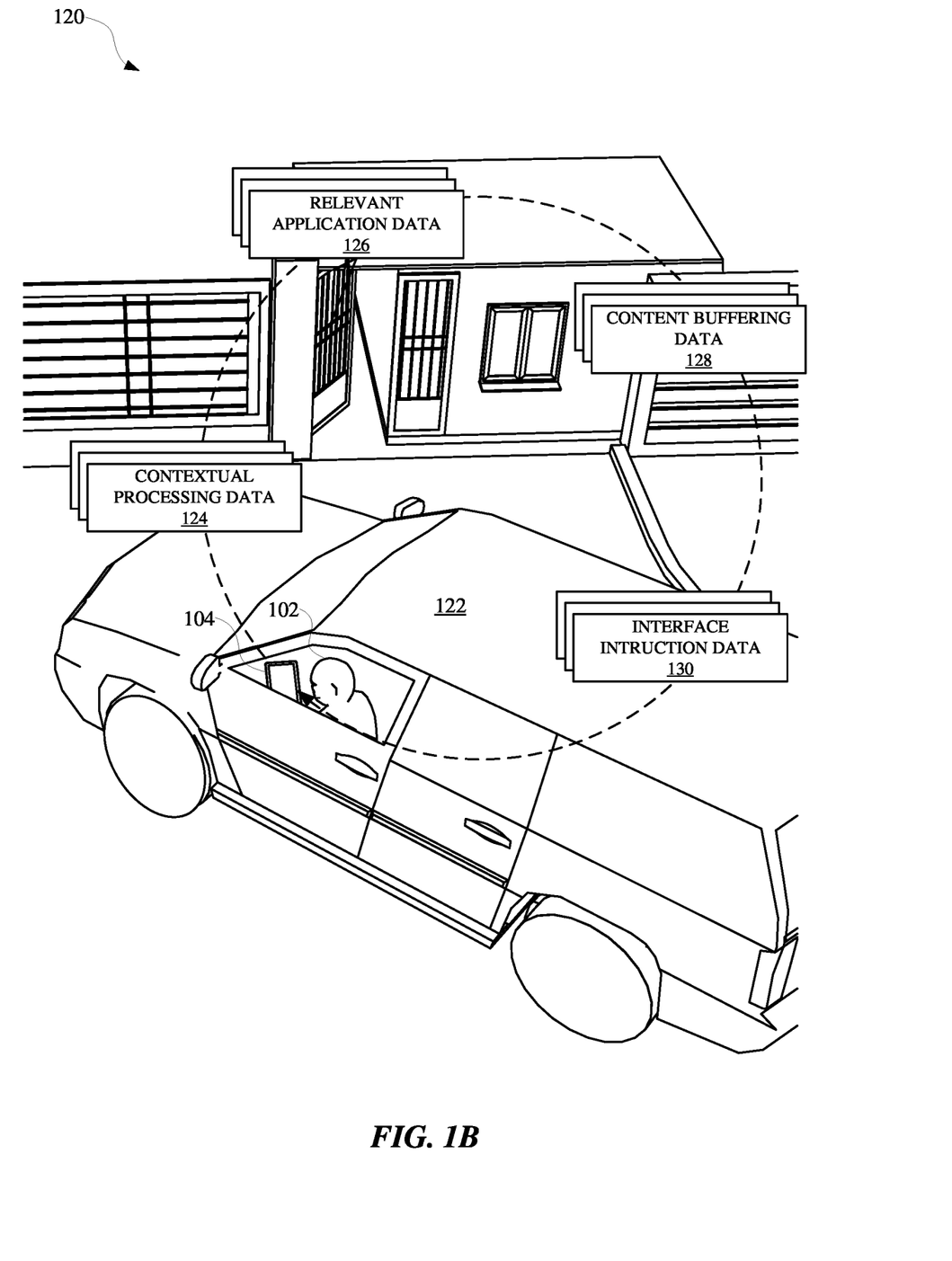
Figure 1C:
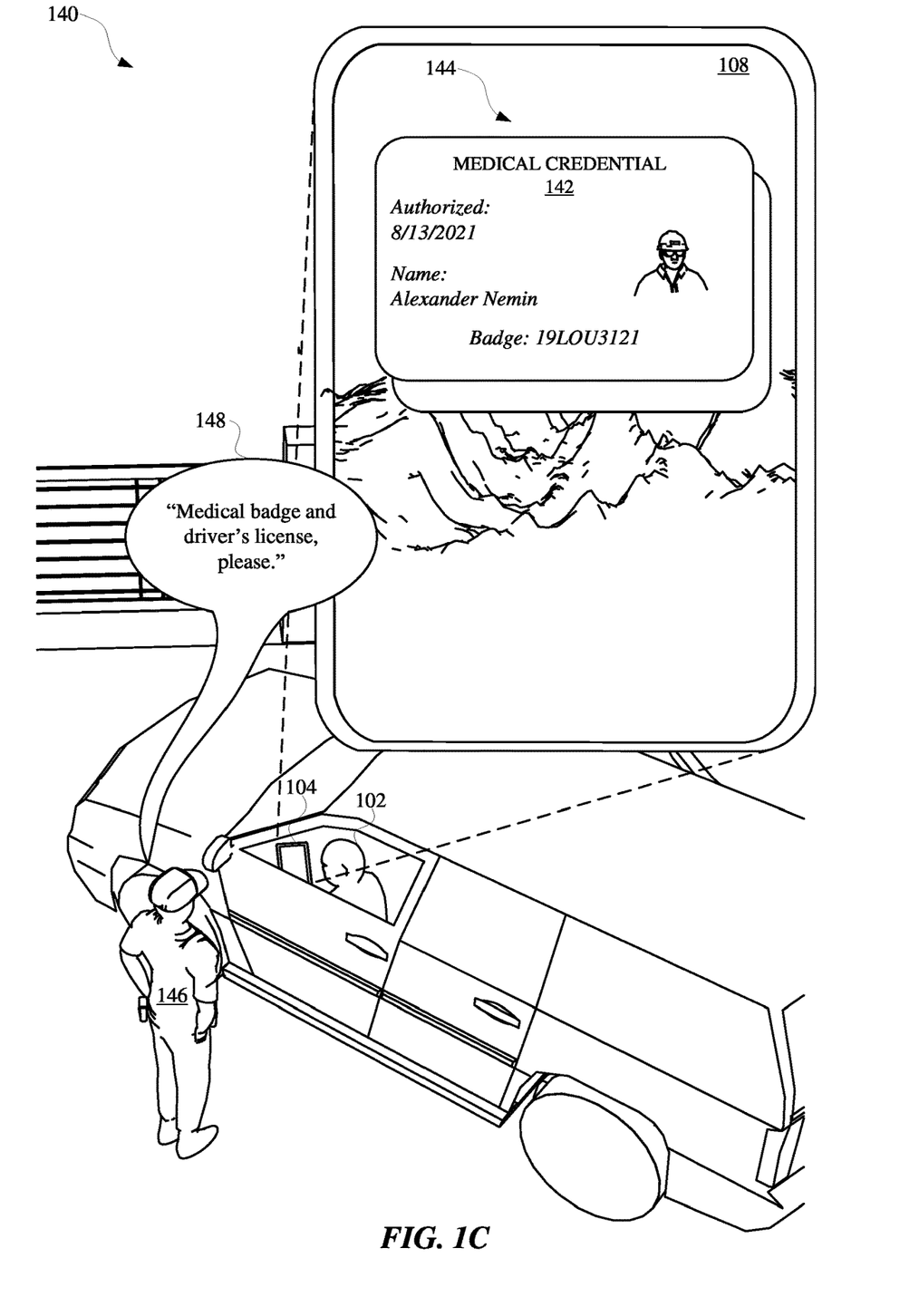

FIG. 1A, FIG. 1B, and FIG. 1C illustrate a view 100, a view 120, and a view 140 of an automated assistant that controls rendering of certain information to an entity that may limit access to a feature of a location according to whether the certain information is presented by a user 102.

The automated assistant can prepare to render the certain information according to whether the user 102 is determined to be at or near the entity. For example, the user 102 can interact with their computing device 104 to create a calendar entry 110 with a calendar application 106. The calendar entry 110 can be rendered at a display interface 108 of the computing device 104, and can include fields for providing details about an event occurring in the future. For example, and as illustrated in FIG. 1A, the user 102 can create a calendar entry 110 for a volunteer event located in "Crestwood, Kentucky." The user 102 can include a description of the event such as, "Volunteer as a medical assistant at a State Fair." The calendar entry 110 can include a date, time, and an address, which can be accessible to an automated assistant with prior permission from the user 102. When the user 102 has completed the creation of the calendar entry 110, the user 102 can use their hand 114 to tap a save button of the calendar application 106 to store the calendar entry 110.

In some implementations, the automated assistant can determine whether the user 102 is within a threshold distance of the location corresponding to the calendar entry 110, and/or whether the user 102 is estimated to arrive at the location within a threshold duration of time. When the user 102 is determined to be within the threshold distance, and/or estimated to arrive (e.g., based on available GPS data, cell tower multilateration, etc.) within the threshold duration of time, the automated assistant can determine whether the location includes an entity that may solicit the user 102 for certain information before granting access to a feature (e.g., a medical tent) of the location. Alternatively, or additionally, the automated assistant can process contextual data associated with the location when the user creates the calendar entry 110, in furtherance of determining whether the location includes an entity that limits access to a feature of a location according to whether certain information is provided by the user 102.

Contextual processing data 124 can be generated based on the location identified in the calendar entry 110 and can characterize features of the entity and/or the location. For example, the contextual processing data 124 can identify one or more entities that may be at or near the location identified in the calendar entry 110. In some implementations, relevant application data 126 associated with the entity and/or the location can be processed in furtherance of determining whether certain information will be requested from the user 102 to access certain features of the location. The relevant application data 126 can be generated based on application data that is accessible via the computing device 104 and/or any other application or device that is associated with the user 102, with prior permission from the user 102. For example, a social media application and/or web browser can provide access to data from various users regarding their experience of accessing the location and/or interacting with the entity at the location from the calendar entry 110. In some instances, another person may have provided a comment that indicates an entity, such as a security guard, will audibly request that any entrant provide a government ID and proof of medical certification. Based on this information, the automated assistant can generate content buffering data 128 to prepare the user 102 for when the entity will request this information.

The content buffering data 128 can include data that the entity may request from the user 102 when the user 102 arrives at the location. The content buffering data 128 can be generated based on the relevant application data 126, and/or other data that can be identified by the automated assistant. For example, the user 102 may have images and/or other device data that characterizes the certain information that the automated assistant has determined the entity may request from the user 102. The images can include, for example, a camera image of the government ID of the user 102, which the user 102 has given the automated assistant express permission to access. The data identified by the automated assistant can also include application data from one or more applications that are accessible via the computing device 104 and/or data extracted from one or more images (e.g., using an object character recognition process). The application data can characterize information that the user 102 may be solicited to provide to the entity for accessing a feature of the location, such as a medical tent and/or other secured location.

In some implementations, the relevant application data 126 can provide information regarding how the certain information should be presented to the entity and/or one or more characteristics of an environment of the entity. For example, a map application can include reviews of a location, which can be processed by the automated assistant as the relevant application data 126. The reviews can include information such as whether there are issues with visibility at the location, a modality (e.g., audio signal above a threshold frequency) through which the certain information may be solicited by the entity, an order in which the entity may request certain documents be presented, and/or any other information that can be relevant to determining how to present the certain information to the entity. Based on these determined characteristics, the automated assistant can generate interface instruction data 130, which can characterize instructions for presenting the certain information to the entity when the user 102 approaches the entity. In some implementations, the interface instruction data 130 can include specifications for a portion of an image and/or a portion of text to be extracted from a document and/or certain information available for presenting to the entity. In this way, portions of information can be restricted from the entity, except for certain portions of the information that may be necessary for fulfilling a request from the entity.

When the user is determined to be at or near the location, the automated assistant can initialize one or more operations based on the instruction data 130. For example, when the automated assistant determines that the user 102 and/or the computing device 104 are at or near the location, the automated assistant can initialize an interface (e.g., one or more sensors) of the computing device 104. The interface can be initialized in furtherance of capturing entity data provided by an entity 146 located at the location. For example, application data can indicate that the entity 146 may provide an audible request for the user 102 to provide certain information. Based on this indication, the automated assistant can initialize an audio interface of the computing device 104 to capture speech from the identity of 146. For instance, the entity 146 can provide an audible request 148 such as, "Medical badge and driver's license, please." The computing device 104 can capture the audible request 148 as input data and/or audio data, and the input data and/or audio data can be processed in furtherance of identifying the request and responding to the request. In some implementations, the automated assistant can process the request and cause the display interface 108 of the computing device 104 to render an arrangement of information being requested by the entity 146.

In some implementations, one or more speech processing techniques can be initialized when the user and/or device is determined to be within a threshold distance of the location, and/or when other criteria are satisfied. The speech processing techniques can include, but are not limited to, ASR, warm word detect, and/or any other speech processing technique for identifying a request for information. For example, the automated assistant can initialize processing of input data using one or more models (e.g., warm word models) for detecting one or more words that may have been identified by other data available to the automated assistant. The other data can include website information, application data, and/or any other information that can be stored in association with the entity. For example, a website may indicate that the entity will request "documents" and, as a result, the automated assistant can employ a model for detecting the word "documents" when the user is within a threshold distance of the location of the entity. Alternatively, or additionally, the automated assistant can filter ASR inputs according to certain data before the user arrives at the location, but then filter ASR inputs according to different data while the user is at or near the location. In this way, power and computational resources can be preserved by limiting an amount of time that ASR and/or warm word detection is performed in anticipation of the user interacting with the entity.

In some implementations, the arrangement 144 can appear as a stacked arrangement of GUI elements, which can receive a gesture at the display interface 108 to reveal other GUI elements. For example, the medical credential 142 (e.g., a first type of information) can appear prioritized over a government ID (e.g., a second type of information). However, when the user 102 swipes the medical credentials 142 away, an image of the government ID can be revealed. In some implementations, depending on contextual data available to the automated assistant, the automated assistant can cause the computing device to be locked or at least limit access to any other application of the computing device, while simultaneously rendering the arrangement 144 of information. For example, when contextual data and/or application data indicates that the entity 146 may request to exclusively and/or personally handle the computing device 104, the automated assistant can cause the computing device 104 to be in a locked state (until the user authenticates with the device) in response to detecting the audible request 148 or other requests from the entity 146. In this way, the user 102 is able to protect any data that they have stored on their device while still willingly revealing certain information that may be requested by another entity.

Figure 2:
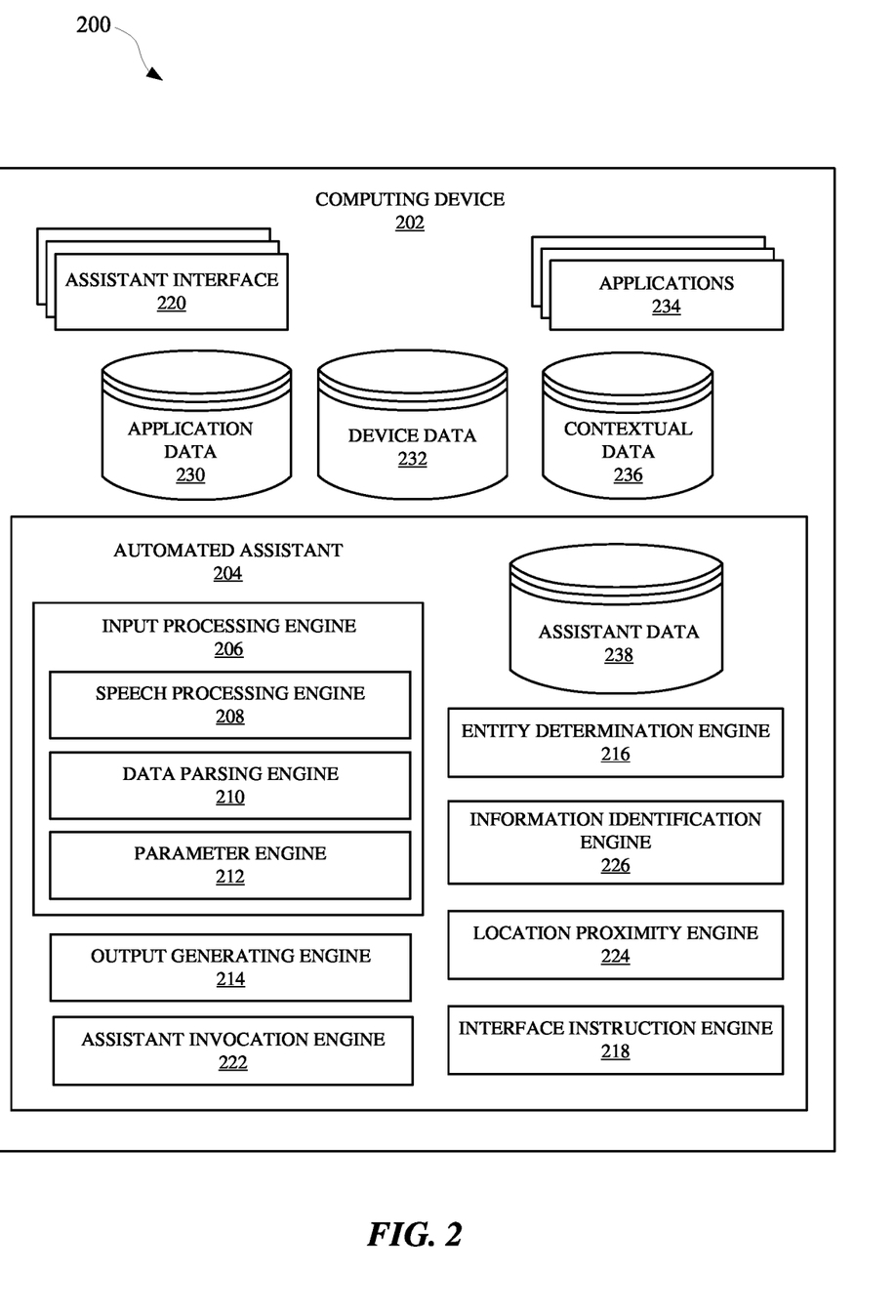
FIG. 2 illustrates a system that provides an automated assistant that can proactively detect and respond to a request for credentials.

FIG. 2 illustrates a system 200 that provides an automated assistant 204 that can proactively detect and respond to a request for credentials. Characteristics of an entity requesting the credentials can be preemptively determined by the automated assistant using data that may be provided by the user or other previous visitors to a location. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include an entity determination engine 216 that can determine whether a user is estimated to arrive at a location, during a subsequent moment in time, and whether the location includes an entity that grants access to the location. The entity determination engine 216 can process data associated with the user to determine, with prior permission from the user, various locations that the user may be traveling to. Each identified location can then be further processed for determining whether an entity is located at the location, and whether the entity will request certain information from the user before granting access to a feature of the location. When the automated assistant 204 determines that the location does include such an entity, an information identification engine 226 can process data for identifying information that may satisfy any requests from the entity.

For example, data stored in association with the user and/or an account of the user can be processed, with prior permission from the user, in furtherance of identifying information that the entity may request from the user. Such information can be determined using location data and/or any information that is available to the automated assistant and that also indicates the type of information that the entity may request from the user. For example, when a name for the location is the subject of a web search, search results can provide information regarding feedback from one or more persons that may have previously visited the location. Based on this feedback, the information identification engine 226 can determine one or more types of identification and/or other information that the entity may request from the user when the user arrives at the location.

In some implementations, the system 200 can include a location proximity engine 224 that can determine whether the user is within a threshold distance from the location, and/or is within a threshold duration of time of arriving at the location. In some implementations, the location proximity engine 224 can process location data (e.g., calendar data, GPS data, etc.) that can indicate a location of the user and/or a trajectory of the user. Alternatively, or additionally, the location proximity engine 224 can process, with prior permission from the user, application data that can indicate an intention of the user to arrive at the location within a particular duration of time. When the user is determined to be within the threshold distance from the location, and/or within a threshold duration of time before arriving at the location, an interface instruction engine 218 can control an interface to render certain information for the entity.

In some implementations, the interface instruction engine 218 can control the interface(s) according to feedback determined from application data processed by the entity determination engine 216. For example, the feedback can include details regarding an ability of the entity to see (e.g., the entity may be far-sided), characteristics of an environment of the entity (e.g., low lighting around the entity), and/or other characteristics associated with the entity. Based on this information, the interface instruction engine 218 can control the rendering of content accordingly, such that the interaction between the user and the entity will be efficiently performed. In some implementations, the interface instruction engine 218 can perform a translation of the certain information prior to the user arriving at the location, such that the certain information will be rendered in a language that is preferred by the entity. Alternatively, or additionally, an optical character recognition (OCR) process can be performed to enhance the rendering of certain information for the entity and/or provide an audible output from text that may be present in an image being requested by the entity.

Figure 3:
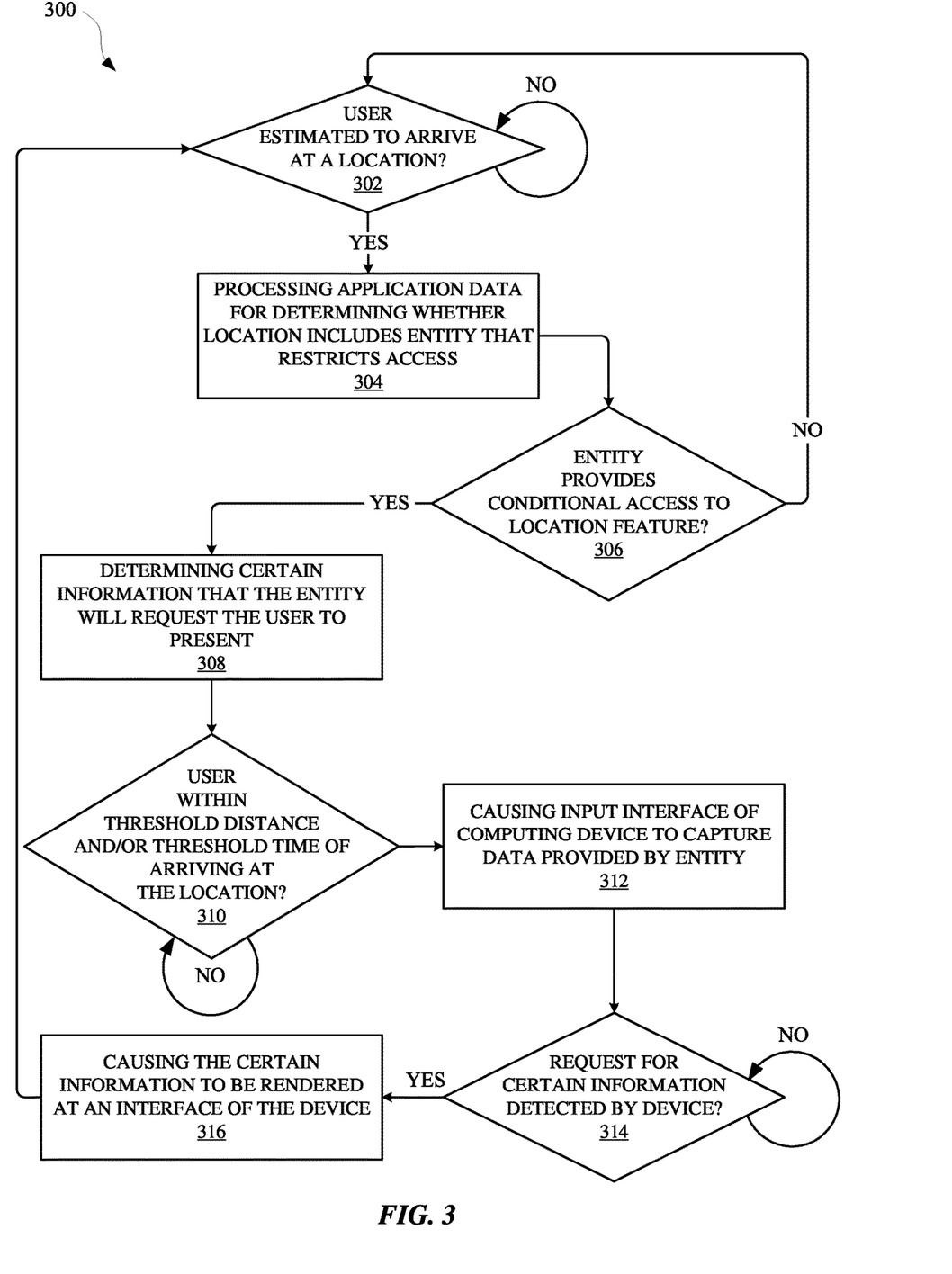
FIG. 3 illustrates an example method for providing an automated assistant that can determine whether a user will be interacting with an entity that will request certain credentials and, in response, proactively initialize an interface of a computing device when a user is approaching the entity.

FIG. 3 illustrates a method 300 for providing an automated assistant that can determine whether a user will be interacting with an entity that will request certain credentials and, in response (and with prior permission from the user), proactively initialize an interface of a computing device when a user is approaching the entity. The interface can be initiated to detect any entity data provided by the entity for requesting certain information from the user. When the automated assistant receives the request, the automated assistant can determine whether the computing device provides access to the certain information and cause the computing device to render the content for the user and/or the entity. The method 300 can be performed by one or more computing devices, applications, and/or any other apparatus or module that can be associated with an automated assistant.

The method 300 can include an operation 302 of determining whether a user is estimated to arrive at a particular location. The determination at the operation 302 can include processing data that is stored in association with the user and/or an account of the user. For example, data that characterizes a schedule of the user can be processed in furtherance of determining whether the user will be traveling to one or more locations within a threshold duration of time (e.g., within the next month or other time). In some implementations, the operation 302 can include determining whether the user will be traveling to a particular entity, such as one or more persons, places, buildings, and/or other objects or spaces. When the user is estimated to be arriving at a location, the method 300 can proceed from the operation 302 to an operation 304. Otherwise, the automated assistant can continue to determine whether the user will be traveling to any particular locations within a threshold duration of time.

The operation 304 can include processing application data for determining whether the location includes an entity that restricts access, and/or otherwise requires certain information be presented before granting access to a feature of the location. For example, the application data can include data from one or more applications, websites, devices, and/or any other sources that an automated assistant is permitted, by users, to access. In some implementations, the application data can include website data that characterizes comments from persons that have visited the location. The comments can include descriptions of the entity (e.g., "There's a security checkpoint at the entrance.") and/or the information that the entity may request from the user when the user arrives at the location. Alternatively, or additionally, the application data can include data from an application (e.g., a map application) that indicates a description of the location and/or images of the location. This data can be further processed (e.g., using image recognition and/or other machine learning techniques) to identify features of the location (e.g., a security checkpoint and motorized gate) that would indicate user authentication may be required before accessing a feature of the location.

The method 300 can proceed from the operation 304 to an operation 306 for determining whether the entity provides conditional access to a feature of the location. When the automated assistant determines that there is an entity that provides conditional access to the location, the method 300 can proceed to the operation 308. Otherwise, the method 300 can return to the operation 302. The operation 308 can include determining certain information that the entity will request the user to present. In some implementations, determining the certain information that the entity will request from the user can include further processing data to identify any information that may be available to the automated assistant and/or that may be requested from the user. In particular, the information that the automated assistant identifies can be estimated to satisfy a condition that the entity may place on access to the feature of the location. In some implementations, a website associated with the location and/or entity can indicate a type of information that can be presented to the entity for obtaining access to the feature. For example, the type of information described by the website can include a government ID, a passport stamp, a barcode on an employee badge, and/or any other type of information that can be presented by a user and/or a device. Data associated with the user can then be processed, with prior permission from the user, for determining whether the type of information is available to the automated assistant. For example, the user may have images of their IDs stored in their personal computing device, which the automated assistant may access with prior permission from the user. Alternatively, or additionally, the automated assistant can generate content for advising the user to provide original versions of certain identification for the entity (e.g., their original passport, driver's license, and/or other documentation).

In some implementations, the method 300 can proceed from the operation 308 to an operation 310 of determining whether the user is within a threshold distance and/or a threshold time of arriving at the location. In some implementations, the automated assistant can process, with prior permission from the user, global positioning system (GPS) or other geolocation data that can indicate a location of the user. Alternatively, or additionally, the automated assistant can process data that can provide an indication of where a particular device and/or user is estimated to be at a particular time, with prior permission from the user. For example, calendar data that includes an entry for a subsequent time can also include details about the location of an event corresponding to the entry. Therefore, when that subsequent time is coming closer (e.g., the time for the calendar entry is 10 minutes away), the automated assistant can reasonably estimate that the user and/or a device of the user will arrive at or near the location between a current time and a time for the calendar entry.

When the automated assistant determines that the user is within a threshold distance and/or a threshold time of arriving at the location, the method 300 can proceed from the operation 310 to an operation 312. Otherwise, the automated assistant can continue to determine whether the user is within the threshold distance and/or the threshold duration of time of arriving at the location. The operation 312 can include causing an input interface of a computing device associated with the user to capture data provided by the entity of the location. In some implementations, the automated assistant captures the entity data in furtherance of determining whether a request from the entity solicits the user and/or a user device to present information for accessing a feature of the location. The entity data can be embodied in natural language provided by one or more persons and/or one or more devices. Alternatively, or additionally, the entity data can be embodied in a device output that is provided at one or more frequencies that are above a threshold frequency (e.g., a percentage of a threshold for audible human hearing). Alternatively, or additionally, the entity data can be embodied in a computer-readable image that a device of the user can scan to determine the request that is embodied in the computer-readable image.

In some implementations, the method 300 can proceed from the operation 312 to an operation 314 that includes determining whether the entity has provided a request for certain information. When the automated assistant determines that the entity data includes a request for certain information, the method 300 can proceed from the operation 314 to an operation 316. Otherwise, as the user is still within the threshold distance and/or threshold time of arriving at the location, the interface of the computing device can continue to capture data for determining whether the entity has provided the request and/or whether the user has fulfilled the request. The operation 316 can include causing the certain information to be rendered at an interface of the computing device, and/or causing a reminder to be rendered for directing the user to manually present the certain information (e.g., present their plastic State ID card, and/or medical agreement that is printed and signed on paper). In some implementations, the automated assistant can cause the information to be rendered according to determined characteristics of an environment of the location and/or the entity. For example, application data can indicate that the entity may desire to have a brighter display when presenting the information to the entity, therefore the automated assistant can cause a light of the computing device to be brighter in response to the user being within the threshold distance and/or threshold time of arriving at the location. Alternatively, or additionally, the data available to the automated assistant can indicate that the entity prefers that the information provided by the user be arranged in a particular order (e.g., first present the State ID, and then present any medical credentials). Based on this indication, the automated assistant can cause the information to be arranged such as a particular instance of information (e.g., an image of a State ID) can be prioritized over a separate instance of information (e.g., an image of a medical ID badge). Alternatively, or additionally, the automated assistant can cause content to be rendered as a reminder for the user to present original versions of certain documents in a particular order (e.g., "Remember to present the State ID first, and then your medical credentials).

Figure 4:
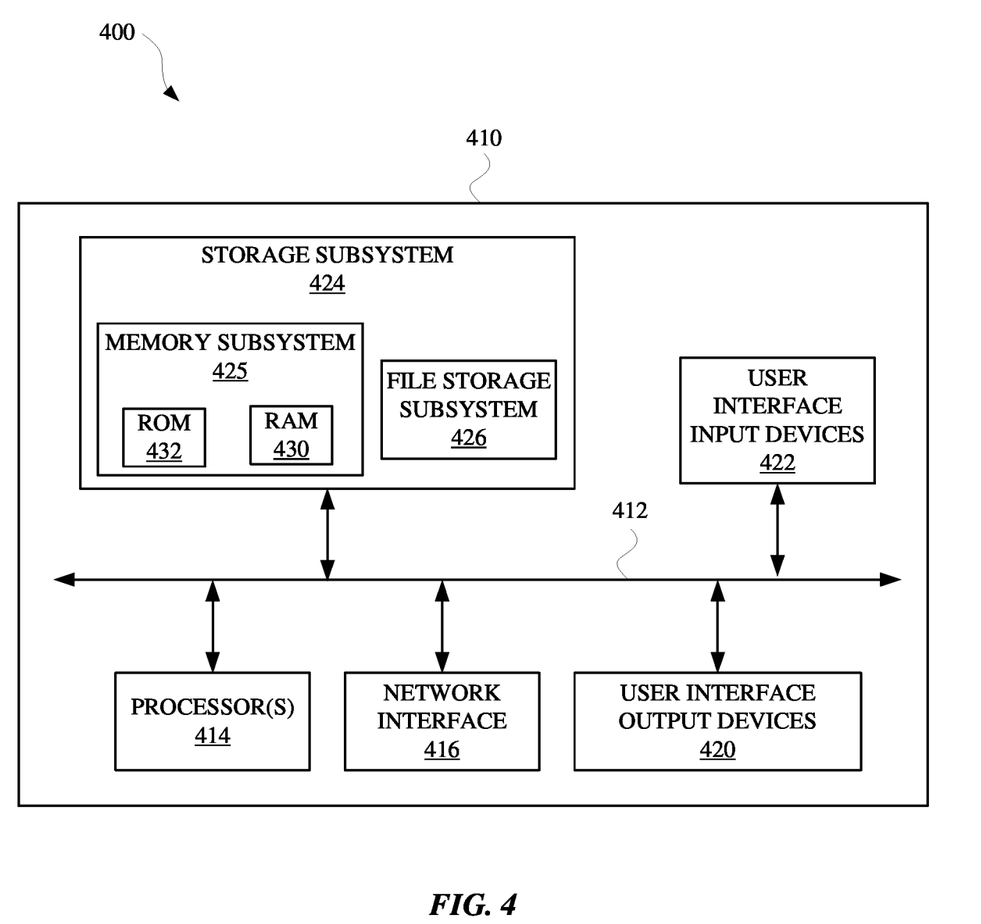
FIG. 4 is a block diagram of an example computer system

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices or Braille readers. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, postal code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, based on data that is stored in association with an account of a user, that the user will arrive at a location. The location includes an entity that grants the user access to a feature of the location according to whether certain information is presented, by the user, to the entity. A client computing device associated with the user provides access to the certain information, and the entity is capable of detecting the certain information when the certain information is rendered, via an interface of the client computing device, at the location. The method can further include causing, when the user has arrived at the location, input data provided by the entity to be captured by the client computing device. The input data is captured in furtherance of determining whether the input data includes a request for the certain information to be presented to the entity. The method can further include determining, based on processing the input data, that the input data includes the request for the user to present the certain information to the entity. The method can further include causing, based on the request and the user arriving at the location, the interface of the client computing device to render content that suggests or embodies the certain information requested by the entity.

In some implementations, the method can further include determining one or more characteristics of an environment of the location and/or the entity that grants access to the feature of the location. In some versions of those implementations, causing the interface of the client computing device to render the content includes causing the content to exhibit one or more other characteristics that compensate for the one or more characteristics of the environment. In some of those versions, the one or more characteristics include a detected amount of illumination, and the one or more other characteristics include a compensated amount of illumination.

In some implementations, determining that the user will arrive at the location that includes the entity includes: processing the data that is accessible, at the client computing device, via an application that is separate from another application that captures the input data from the entity. The data indicates that the entity grants access to the feature of the location according to whether the certain information is presented.

In some implementations, the entity includes one or more persons, and the input data characterizes audible speech of the one or more persons. In some implementations, causing the input data from the entity to be captured by the client computing device includes: processing audio emitted by a device associated with the entity. In some of those implementations, the audio embodies one or more frequencies that are equal to or greater than 20,000 Hertz.

In some implementations, the certain information includes a particular type of document to be presented by the user to the entity, and the content rendered by the interface of the client computing device includes a notification that solicits the user to present a tangible version of the particular type of document to the entity.

In some implementations, determining that the user will arrive at the location that includes the entity that grants the user access to the feature of the location according to whether the certain information is presented, by the user, to the entity at the location includes: processing the data that is generated by the user when or after the user previously visited the location. The data characterizes user feedback, provided by the user via a web browser or other application, indicating that the entity grants access to the feature of the location according to whether the certain information is presented.

In some implementations, determining that the user will arrive at the location that includes an entity that grants the user access to the feature of the location according to whether certain information is presented, by the user, to the entity at the location includes: processing the data that is generated by one or more other users that have visited the location. The data characterizes user feedback, provided by the one or more other users via a web browser or other application, indicating that the entity grants access to the feature of the location according to whether the certain information is presented.

In some implementations, the method further includes processing application data in furtherance of identifying the content that corresponds to the certain information requested by the entity. Processing the application data can include performing a character recognition process on an image included in the application data and/or can include extracting a portion of an image, or a portion of text, from a document that is included in the application data.

In some implementations, the method further includes determining, based on the input data, that the input data identifies a particular type of information to be prioritized over an additional type of information when presenting the certain information to the entity at the location. In some of those implementations, causing the interface of the client computing device to render the content includes causing the content to be arranged to prioritize the particular type of information over the additional type of information.

In some implementations, the method further includes causing, while the client computing device is rendering the content that embodies the type of information identified by the input data, the client computing device to provide limited access to applications installed on the client computing device until the user authenticates with the client computing device.

In some implementations, causing the interface of the client computing device to render the content that embodies the type of information identified by the input data includes: causing the content to embody a natural language translation of information that is accessible via the client computing device or another computing device associated with the user.

In some implementations, a method implemented by one or more processors is set forth as including operations such as determining, based on contextual data that is accessible to a client computing device associated with a user, that the user is estimated to arrive at a location during a subsequent moment in time. The method can further include processing, based on determining the location, application data in furtherance of determining whether the location includes an entity that provides access to a feature of the location according to whether the user presents certain information to the entity when the user arrives at the location. The method can further include, when the application data indicates that the location includes the entity that provides access to the feature according to whether the user presents the certain information to the entity: determining, based on location data associated with the user, that the user is within a threshold distance of the location, or is estimated to arrive at the location within a threshold duration of time. The method can further include causing, based on the location data and the application data, an input interface of the client computing device to be active in furtherance of capturing entity data provided by the entity. The entity data embodies a request for the user to present the certain information to the entity. The method can further include causing, based on the entity data captured by the client computing device, the client computing device, or an additional computing device, to render content at an interface. The content includes or suggests the certain information requested by the entity data.

In some implementations, the method can further include causing, based on the location data and the application data, the interface of the client computing device, or the additional computing device, to render a reminder for the user regarding the certain information to be presented by the user, to the entity, at the location. In some of those implementations, the reminder is rendered prior to the user being within the threshold distance of the location and prior to the user arriving at the location.

In some implementations, the method can further include causing, while the client computing device or the additional computing device is rendering the content, the client computing device or the additional computing device to provide limited access to applications installed on the client computing device or the additional computing device until the user authenticates with the client computing device or the additional computing device.

In some implementations, a method implemented by one or more processors is set forth as including operations such as determining, based on data associated with a user, that the user is within a threshold distance of a location that includes an entity that limits access to a feature of the location according to whether certain information is presented to the entity by the user. The method can further include causing, based on the data, an input interface of the client computing device to be active in furtherance of capturing entity data provided by the entity. The entity data embodies a request for the user to present the certain information to the entity. The method can further include causing, based on the entity data captured by the client computing device, the client computing device, or an additional computing device, to render content for the entity. The content includes or suggests the certain information requested via the entity data.

In some implementations, the method can further include causing, in response to determining that the user is within the threshold distance of the location that includes the entity, a speech processing technique to be initialized in furtherance of determining whether the entity has provided the request for the certain information. The speech processing technique can be utilized to process the entity data. In some implementations, the speech processing technique includes warm word detection and/or automated speech recognition (ASR).

We claim:
1. A method implemented by one or more processors, the method comprising:
   determining, based on data that is stored in association with an account of a user, that the user will arrive at a location that includes an entity that grants the user access to a feature of the location according to whether certain information is presented, by the user, to the entity,
      wherein a client computing device associated with the user provides access to the certain information, and the entity is capable of detecting the certain information when the certain information is rendered, via an interface of the client computing device, at the location;
   causing, when the user has arrived at the location, input data provided by the entity to be captured by the client computing device,
      wherein the input data is captured in furtherance of determining whether the input data includes a request for the certain information to be presented to the entity;
   determining, based on processing the input data, that the input data:
      includes the request for the user to present the certain information to the entity, and
      identifies a particular order to render the certain information to the entity at the location; and
   causing, based on the request and the user arriving at the location, the interface of the client computing device to render content that suggests or embodies the certain information, in the particular order, requested by the entity,
      wherein the certain information is rendered in the particular order based on the request identifying the particular order.
2. The method of claim 1, further comprising:
   determining one or more characteristics of an environment of the location and/or the entity that grants access to the feature of the location,
      wherein causing the interface of the client computing device to render the content includes causing the content to exhibit one or more other characteristics that compensate for the one or more characteristics of the environment.

3. The method of claim 2, wherein the one or more characteristics include a detected amount of illumination, and the one or more other characteristics include a compensated amount of illumination.

4. The method of claim 1, wherein determining that the user will arrive at the location that includes the entity includes:
processing the data that is accessible, at the client computing device, via an application that is separate from another application that captures the input data from the entity,
wherein the data indicates that the entity grants access to the feature of the location according to whether the certain information is presented.

5. The method of claim 1, wherein the entity includes one or more persons, and the input data characterizes audible speech of the one or more persons.

6. The method of claim 1, wherein causing the input data from the entity to be captured by the client computing device includes:
processing audio emitted by a device associated with the entity,
wherein the audio embodies one or more frequencies that are equal to or greater than 20,000 Hertz.

7. The method of claim 1,
wherein the certain information includes a particular type of document to be presented by the user to the entity, and
wherein the content rendered by the interface of the client computing device includes a notification that solicits the user to present a tangible version of the particular type of document to the entity.

8. The method of claim 1, wherein determining that the user will arrive at the location that includes the entity that grants the user access to the feature of the location according to whether the certain information is presented, by the user, to the entity at the location includes:
processing the data that is generated by the user when or after the user previously visited the location,
wherein the data characterizes user feedback, provided by the user via a web browser or other application, indicating that the entity grants access to the feature of the location according to whether the certain information is presented.

9. The method of claim 1, wherein determining that the user will arrive at the location that includes an entity that grants the user access to the feature of the location according to whether certain information is presented, by the user, to the entity at the location includes:
processing the data that is generated by one or more other users that have visited the location,
wherein the data characterizes user feedback, provided by the one or more other users via a web browser or other application, indicating that the entity grants access to the feature of the location according to whether the certain information is presented.

10. The method of claim 1, further comprising:
processing application data in furtherance of identifying the content that corresponds to the certain information requested by the entity,
wherein processing the application data includes performing a character recognition process on an image included in the application data.

11. The method of claim 1, further comprising:
processing application data in furtherance of identifying the content that corresponds to the certain information requested by the entity,
wherein processing the application data includes extracting a portion of an image, or a portion of text, from a document that is included in the application data.

12. The method of claim 1, wherein the request for the user to present the certain information to the entity contains natural language that identifies the particular type of information to be prioritized over the additional type of information and that identifies the particular order when rendering the certain information to the entity at the location.

13. The method of claim 1, further comprising:
causing, while the client computing device is rendering the content that embodies the type of information identified by the input data, the client computing device to provide limited access to applications installed on the client computing device until the user authenticates with the client computing device.

14. The method of claim 1, wherein causing the interface of the client computing device to render the content that embodies the type of information identified by the input data includes:
causing the content to embody a natural language translation of information that is accessible via the client computing device or another computing device associated with the user.

15. A method implemented by one or more processors, the method comprising:
determining, based on contextual data that is accessible to a client computing device associated with a user, that the user is estimated to arrive at a location during a subsequent moment in time;
processing, based on determining the location, application data in furtherance of determining whether the location includes an entity that provides access to a feature of the location according to whether the user presents certain information to the entity when the user arrives at the location; and
when the application data indicates that the location includes the entity that provides access to the feature according to whether the user presents the certain information to the entity:
determining, based on location data associated with the user, that the user is within a threshold distance of the location, or is estimated to arrive at the location within a threshold duration of time;
causing, based on the location data and the application data, a speech processing technique to be initialized at the client computing device to be active in furtherance of capturing entity data provided by the entity,
wherein the entity data embodies a request for the user to present the certain information to the entity;
causing, based on the entity data captured by the client computing device, the client computing device, or an additional computing device, to render content at an interface,
wherein the content includes or suggests the certain information requested by the entity data.

16. The method of claim 15, further comprising:
causing, based on the location data and the application data, the interface of the client computing device, or the additional computing device, to render a reminder for the user regarding the certain information to be presented by the user, to the entity, at the location, wherein the reminder is rendered prior to the user being within the threshold distance of the location and prior to the user arriving at the location.

17. The method of claim 15, further comprising:
causing, while the client computing device or the additional computing device is rendering the content, the client computing device or the additional computing device to provide limited access to applications installed on the client computing device or the additional computing device until the user authenticates with the client computing device or the additional computing device.

18. A method implemented by one or more processors, the method comprising:
determining, based on data associated with a user, that the user is within a threshold distance of a location that includes an entity that limits access to a feature of the location according to whether certain information is presented to the entity by the user;
causing, based on the data, an input interface of the client computing device to be active in furtherance of capturing entity data provided by the entity,
wherein the entity data embodies a request for the user to present the certain information to the entity;
causing, in response to determining that the user is within the threshold distance of the location that includes the entity, a speech processing technique to be initialized in furtherance of determining whether the entity has provided the request for the certain information,
wherein the speech processing technique is utilized to process the entity data; and
causing, based on the entity data captured by the client computing device, the client computing device, or an additional computing device, to render content for the entity,
wherein the content includes or suggests the certain information requested via the entity data.

19. The method of claim 18, wherein the speech processing technique includes warm word detection or automated speech recognition (ASR).

20. The method of claim 1, further comprising:
causing, when the user has arrived at the location, a speech processing technique to be initialized in furtherance of determining whether the input data includes a request for the certain information to be presented to the entity,
wherein the speech processing technique is utilized to process the input data.

* * * * *